No. 612,254. Patented Oct. 11, 1898.
P. A. MARTIN.
PNEUMATIC TIRE.
(Application filed Feb. 26, 1898.)
(No Model.) 2 Sheets—Sheet 1.
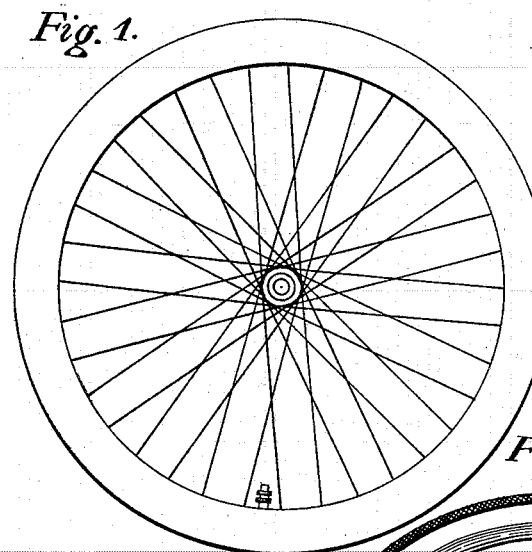
Fig. 1.
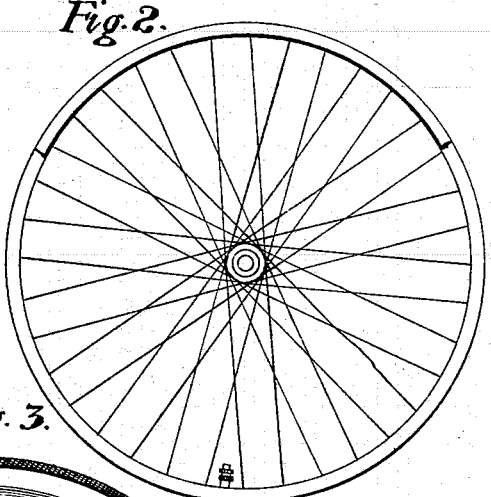
Fig. 2.
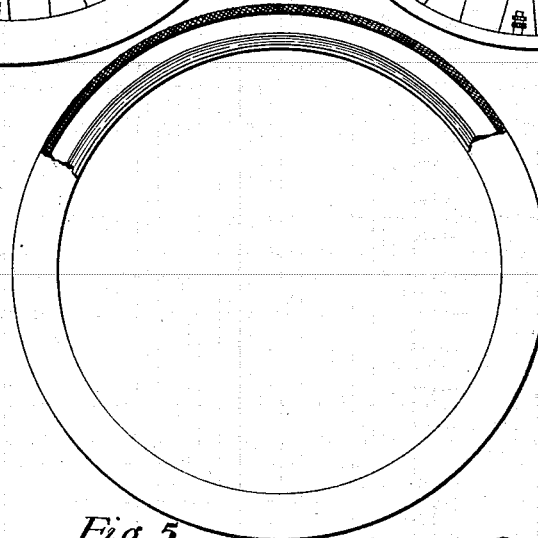
Fig. 3.
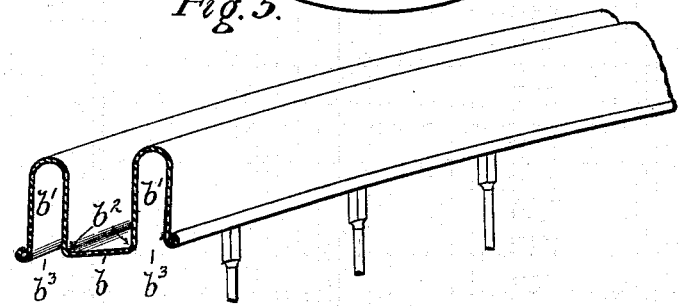
Fig. 5.
WITNESSES
INVENTOR
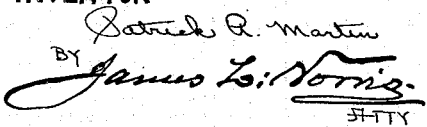

No. 612,254. Patented Oct. 11, 1898.
P. A. MARTIN.
PNEUMATIC TIRE.
(Application filed Feb. 26, 1898.)
(No Model.) 2 Sheets—Sheet 2.
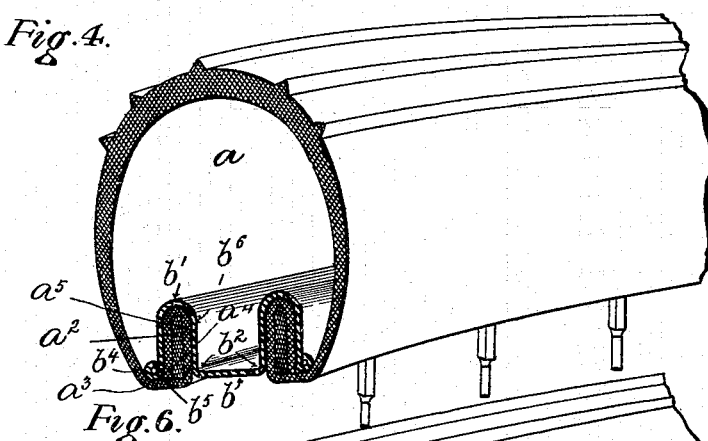
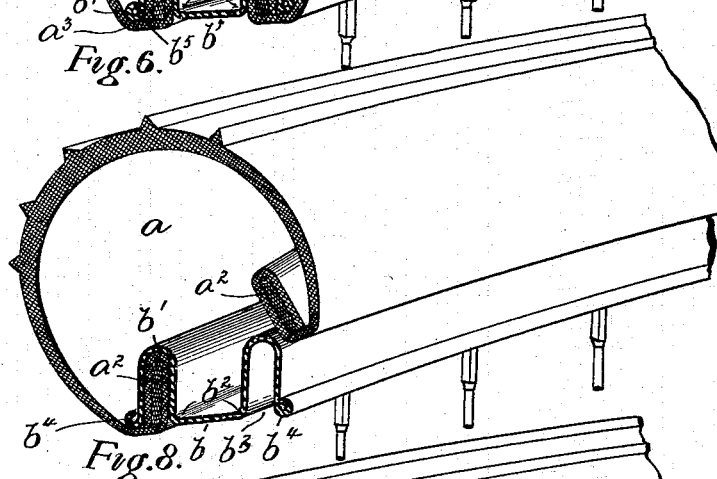
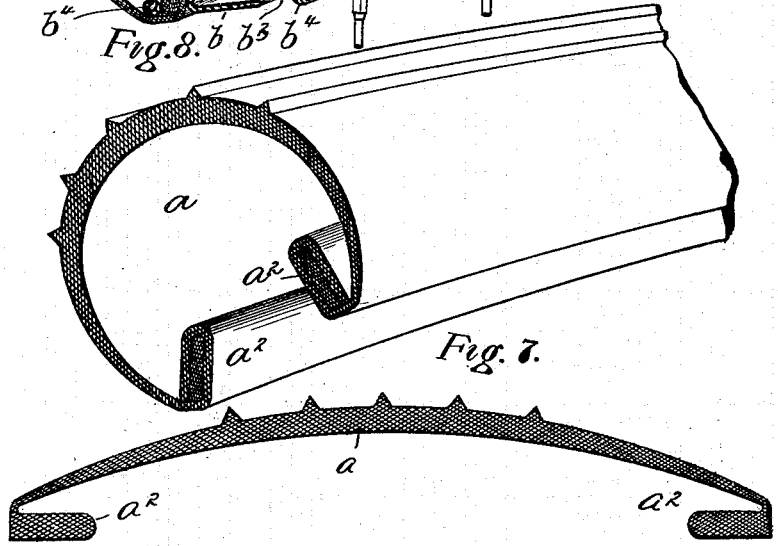
WITNESSES INVENTOR Patrick A. Martin
BY James L. Norris
ATTY.

UNITED STATES PATENT OFFICE.

PATRICK ALPHONSUS MARTIN, OF BIRMINGHAM, ENGLAND.

PNEUMATIC TIRE.

SPECIFICATION forming part of Letters Patent No. 612,254, dated October 11, 1898.

Application filed February 26, 1898. Serial No. 671,817. (No model.)

*To all whom it may concern:*

Be it known that I, PATRICK ALPHONSUS MARTIN, manufacturer, a subject of the Queen of Great Britain, residing in Granville street, in the city of Birmingham, England, have invented certain new and useful Improvements in Pneumatic Tires, of which the following is a specification.

My invention has reference to pneumatic tires or pneumatic-wheel circumferences for use in connection with cycles and common road-vehicles, and has for its object to facilitate the attachment and detachment of the tire (in the case of a tubeless tire) or the cover (in the case of a tube-tire) to or from the rim of a wheel.

My invention comprises an inflatable tire or cover having thickened edges or deep annular feet made of soft material, such as rubber, adapted to be inserted within inverted, deep-troughed, or hook-sectioned annular channels formed in and making part of a wheel-rim and having the circumferential mouths of the same opening on the inner periphery of such rim, while the tire is firmly held upon or locked to the rim by the pull exerted by the outward distention of the walls of the inflated tire.

Figure 1 of the accompanying drawings represents a side elevation of a cycle-wheel provided with a rim and tire constructed according to my invention. Fig. 2 is an elevation, with a part in section of the said wheel, with the tire removed from the rim. Fig. 3 is an elevation, partly in section, of the tire separately, with the edges of the same bent up into the position they would assume when on the rim. Fig. 4 represents, upon an enlarged scale, a perspective view of a section of the said tire and rim with the annular feet on the edges of the former engaged in the deep trough formations of the latter and with the tire inflated. Fig. 5 is a perspective view, on the same scale as Fig. 4, of a portion of the rim separately and showing more clearly the shape in cross-section of the same. Fig. 6 is a like view of the tire partly engaged with the rim. Fig. 7 is a section of the endless band of material from which the tire or tire-cover is made laid out flat. Fig. 8 is a perspective view of a portion of the said tire.

The same letters of reference indicate corresponding parts in the several figures of the drawings.

$a$ is a pneumatic tire, (shown as of the tubeless type,) consisting of an endless band of rubber or other material and constituting, when attached to the wheel-rim, an arch-sectioned inflatable tube or air-retaining chamber, while its circumferential selvage edges are provided with soft or pliable and thickened deep annular ribs or feet $a^2$, coming upon and being secured to the inner side of the edges of the tire and following circumferentially the contour thereof, and which when the said tire is bent over into the form shown in Fig. 6 are presented to and are adapted to take and fit within deep inverted channels or continuous sockets $b'$, having the form of an inverted U and extending around the outer opposite edges $b^2$ of the rim $b$, with their mouths or entrances $b^3$ opening upon the under side of the said rim.

After the soft or pliable foot edges of the tire have been inserted into and forced fully home within the channels of the rim, as shown at Fig. 4 and at the left-hand side of Fig. 8, the operation of inflating the tire distends the walls thereof in proportion to the internal air-pressure set up, and the parts $a^3$, adjacent to the junctions of the sides with the annular feet, are drawn radially and laterally around the outer edges $b^4$ of the rim, while the edges $a^4$ of the feet are forcibly drawn against the insides of the channels at $b^5$, about which last-named points the feet turn as fulcra, so as to force the inner sides $a^5$ of the said feet against the inward walls $b^6$ of the said channels, and by this frictional adhesion, combined with the drag of the yielding material of the walls over the edges $b^4$, the tire is secured to the rim and a perfect air-tight joint is made between them.

It is understood that the feet of the tire are preferably made an easy fit within the channels of the rim, thus facilitating the attachment and detachment of the same; but when the tire is inflated the said feet are locked within the channels and form perfectly airtight joints, as before referred to. Further, instead of the feet of the tire being soft throughout they may be only faced with soft rubber, and, if found desirable, the edges and inner walls of the troughs of the rim may, as an additional precaution, be fixed with soft rubber, thereby creating additional friction or drag between these parts and the feet of the tire.

Having now particularly described and ascertained the nature of my said invention and in what manner the same is to be performed, I declare that what I claim is—

1. A pneumatic tire consisting of an inflatable cover having annular and inwardly-directed thickened feet, or edges of soft material, such as rubber, and a rim consisting of sheet metal having a flat central portion with a deep-troughed annular channel on each side of and at a right angle to said central portion, the open mouth of said channel being turned toward the inner periphery of said tire, substantially as described.

2. In a pneumatic wheel, the combination with a wheel-rim formed of a single strip of metal and consisting of a flat central portion having deep annular channels at its edges, said channels having in cross-section substantially the form of an inverted U, their mouths opening toward and in the same plane with the inner face of the central portion, of a tire provided at its edges with annular feet of uniform thickness which are adapted to take into the channels of the rim and be locked therein by the inflation of the tire, substantially as described.

In testimony whereof I have hereunto set my hand in presence of two subscribing witnesses.

PATRICK ALPHONSUS MARTIN.

Witnesses:
 HENRY SKERRETT,
 WILLIAM H. LONG.